United States Patent [19]

Deimel et al.

[11] 4,251,303

[45] Feb. 17, 1981

[54] METHOD AND APPARATUS FOR MAKING A FILLET-SEAM CLOSURE ON A FOLDING CARTON, PARTICULARLY A PEAKED-TOP CARTON

[75] Inventors: Gerhard Deimel, Opladen; Paul Schmidt, Dusseldorf; Harald Sturm, Meerbusch, all of Fed. Rep. of Germany

[73] Assignee: Jagenberg Werke Aktiengesellschaft, Dusseldorf, Fed. Rep. of Germany

[21] Appl. No.: 22,007

[22] Filed: Mar. 19, 1979

[30] Foreign Application Priority Data

Mar. 20, 1978 [DE] Fed. Rep. of Germany ....... 2812137

[51] Int. Cl.$^3$ ...................... B30B 15/34; B32B 31/20; B65B 7/18
[52] U.S. Cl. ..................................... 156/73.1; 53/477; 53/373; 53/379; 156/308.4; 156/580.2; 156/182; 493/184
[58] Field of Search ................. 156/73.1, 580.1, 580.2, 156/581, 73.4, 583.1, 308.4; 93/44.1 GT; 53/477, 373, 379

[56] References Cited

U.S. PATENT DOCUMENTS

| | | | |
|---|---|---|---|
| 2,596,933 | 5/1952 | Kirk | 156/583.1 |
| 3,078,201 | 2/1963 | Christie | 156/583.1 |
| 3,321,353 | 5/1967 | Zelnick | 156/583.1 X |
| 3,679,509 | 7/1972 | Fielibert | 53/373 |
| 3,910,014 | 10/1975 | Braun | 156/581 |
| 4,068,032 | 1/1978 | Alonso | 156/73.1 |
| 4,145,236 | 3/1979 | Neumayer et al. | 156/73.1 X |

*Primary Examiner*—Michael G. Witysyn
*Attorney, Agent, or Firm*—Sprung, Felfe, Horn, Lynch & Kramer

[57] ABSTRACT

A method and an apparatus for making a fillet seam closure on folding boxes fabricated from box-board internally lined with aluminum foil and coated with a thermal plastic resin includes folding the fillet seam along a fold line, holding the areas of the fillet seam to be welded together by applying compressive forces along a line parallel to the desired weld seam and slightly spaced therefrom between the weld seam and the fold line and ultrasonically welding the fillet seam with a simultaneous application of pressure in the weld seam which gradually decreases from the weld seam center line to the edge facing the fold line to effect the displacement of the thermal plastic resin from the center line towards the edge in the formation of a V-joint. The weld is allowed to cool off and the compressor forces are maintained during the welding and the cooling operations.

7 Claims, 1 Drawing Figure

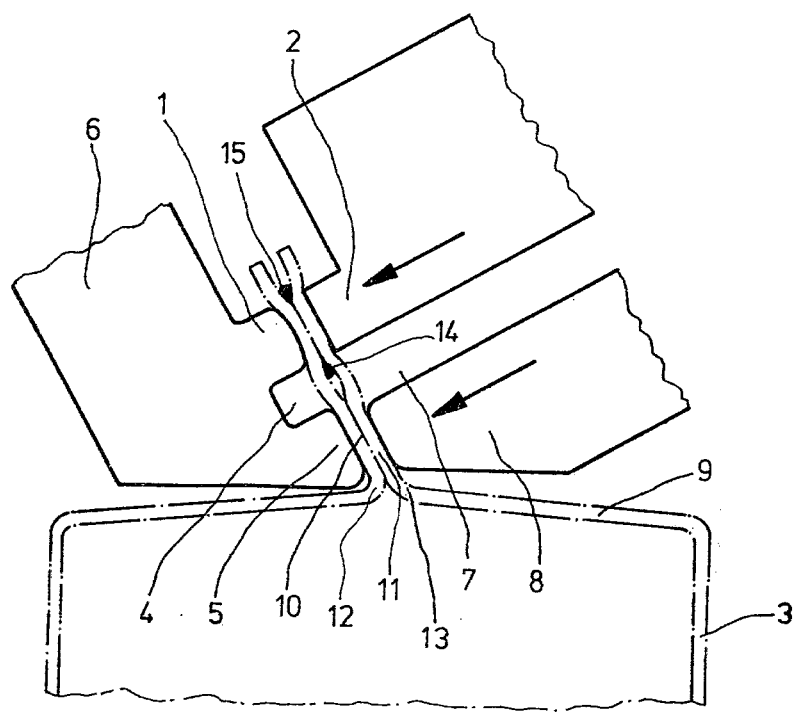

METHOD AND APPARATUS FOR MAKING A FILLET-SEAM CLOSURE ON A FOLDING CARTON, PARTICULARLY A PEAKED-TOP CARTON

BACKGROUND OF THE INVENTION

The invention relates to a method of making a fillet-seam closure by ultrasonic welding on a folding carton, particularly a peaked-top carton fabricated from boxboard coated with a thermoplastic resin.

In a prior art method of this type, the fillet-seam areas to be welded together after the peaked top of the folding carton has been folded are placed between a so-called anvil and a sonotrode in which vibrations are induced ultrasonically. Through the excitation of the sonotrode with ultrasonic energy, the synthetic-resin layer disposed on the facing sides of the areas to be welded together is softened and fused.

Practical experience has shown that a fillet-seam weld produced ultrasonically cannot be relied on to provide a tight seal on the folding carton, especially when the carton also has an inner aluminum-foil liner. The reason for this, according to U.S. Pat. No. 3,910,014 is that there will be craterlike gaps in the seam weld.

SUMMARY OF THE INVENTION

The invention has as its object to improve the method outlined above in such a way that a satisfactory fillet-seam weld providing a tight seal for the folding carton can be produced ultrasonically.

In accordance with the invention, this object is accomplished in that after the fillet seam has been folded, the areas thereof to be welded together on the side of the weld to be produced which faces the interior of the carton are held together by externally applied pressure which is maintained during the welding and cooling off.

The invention has produced the surprising result that a satisfactory fillet-seam weld, that is to say, a seam weld free of craters and therefore absolutely tight, can be obtained as a seal for the folding carton by conventional ultrasonic welding methods if the two areas to be welded together are held firmly together during welding. In this, the invention is based on the realization that after the peaked top has been folded, the fillet-seam areas to be welded together will not, because of restoring forces of the boxboard stock, remain in sufficiently intimate contact with each other during the welding operation, notwithstanding the high frequency of the sonotrode vibrations which act on the joint. Now this drawback can be overcome with the extremely simple means in accordance with the invention.

In accordance with one variant of the invention, the pressure is applied along a line parallel to the weld and slightly spaced therefrom. By this expedient, a means of escape is provided for thermoplastic material expelled toward the edge. The pressure is preferably applied at a short distance from the fold line (between fillet seam and peak). In this variant, there is full assurance, even with pressure being applied only to a line and with utilization of the break in the weld-seam area, that these areas will be held together during welding.

The mechanical strength of the weld and its tightness can be further improved by steadily reducing the pressure in the weld during welding from the weld centerline to the edge facing the interior of the carton in such a way that the thermoplastic resin being displaced from the centerline toward the edge forms a V-joint.

An apparatus for the practice of the method in accordance with the invention has as welding tools an anvil and a sonotrode cooperating therewith and vibrated by ultrasonic energy. In accordance with the invention, such an apparatus is characterized by the fact that cooperating pressing tools are provided at the carton end, both adjacent to the anvil and adjacent to the sonotrode, and slightly spaced from anvil and sonotrode. The anvil preferably has a rib of rounded cross section which extends in the direction of the fillet seam and serves as an abutment surface for the sonotrode.

BRIEF DESCRIPTION OF THE DRAWING

The invention will now be explained in greater detail with reference to the FIGURE, which illustrates a portion of the welding tools during the welding operation.

DETAILED DESCRIPTION OF THE INVENTION

The welding apparatus required for the welding method comprises as welding tools an anvil 1 and, cooperating therewith, an ultrasonically operated sonotrode 2. Such a welding apparatus is known in principle from U.S. Pat. No. 3,468,731.

In addition to the anvil 1 and separated from it by a gap 4 is a folding tool 5 mounted on the same holder on the side facing a folding carton 3. And in addition to the sonotrode 2 and separated from it by a gap 7 located opposite the gap 4, there is disposed, on the side facing the folding carton 3, a second folding tool 8 which is supported through a compression spring (not shown) on the holder (also not shown) of the sonotrode 2 and cooperates with the first folding tool 5. The welding and folding tools 1, 2, 5 and 8 are moved in the manner of a tongs. This can be done by means of a drive such as disclosed in German patent application DOS No. 2,520,400.

When the folding carton 3 is conveyed in transverse position, with the peaked top 9 still open but provided with fold lines, within the reach of the folding tools 5 and 8, still spread apart, the latter move toward each other in the manner of a tongs, thus bringing the peaked top 9 into the folded position shown in the FIGURE, in which welding as such is effected.

During the welding operation, the fillet-seam areas 10 and 11 to be welded together, coated on the inside with a thermoplastic material such as polyethylene, are held together by the folding tools 5 and 8 directly above the fold lines 12 and 13 over the entire length of the seam. The welding tools 1 and 2 act on the seam at a short distance from the folding tools 5 and 8. As soon as the sonotrode 2 is excited with ultrasonic energy, the thermoplastic material softens and because of the slight convex curvature of the surface of anvil 1 is so displaced toward the edges that V-joints 14 and 15 form there. These V-joints are of considerable importance with regard to both the mechanical strength and the tightness of the closure.

After the weld has been produced in this way, the ultrasonic energy can be turned off. However, the fillet-weld areas 10 and 11 continue to be held together by the folding tools 5 and 8 for a short time, until the weld has cooled sufficiently to hold said areas together on its own.

Since in the invention the possible restoring forces of the fillet-seam areas 10 and 11 are checked by the folding tools 5 and 8, these seam areas remain together in the area of the weld during the welding operation. There is no longer any formation of craters detrimental to mechanical strength and tightness during welding.

The method in accordance with the invention offers advantages also with respect to fixturing, since no additional jigs are needed to hold the fillet-seam areas together since this can be done with the folding tools which are present in any case and which in this case are actuated jointly with the welding tools.

We claim:

1. A method of making a fillet seam closure on folding boxes fabricated from boxboard internally lined with aluminum foil and coated with a thermoplastic resin, comprising the steps of: folding the fillet seam along a fold line; holding the areas of the fillet seam to be welded together by applying compressive forces along a line parallel to the desired weld seam and slightly spaced therefrom between the weld seam and the fold line; ultrasonically welding the fillet seam with a simultaneous application of pressure in the weld seam which gradually decreases from the weld seam centerline to the edge facing the fold line to effect the displacement of the thermoplastic resin from the centerline toward the edge and the formation of a V-joint; allowing the weld to cool off; and maintaining the compressive forces during the welding and cooling steps.

2. A method according to claim 1, wherein the compressive forces are applied at a short distance from the fold line.

3. In an apparatus for making a fillet seam closure on a folding box of boxboard or the like which is internally lined with aluminum foil and coated with a thermoplastic resin, the improvement comprising: first means for both folding the fillet seam along a fold line and applying compressive forces along a line parallel to the desired weld seam and slightly spaced therefrom between the weld seam and the fold line to hold the areas of the fillet seam to be welded together during the welding and the subsequent cooling off; and second means for ultrasonically welding the fillet seam with a simultaneous application of pressure in the weld seam which gradually decreases from the weld seam centerline to the edge facing the fold line to effect the displacement of the thermoplastic resin from the centerline toward the edge and the formation of a V-joint.

4. The apparatus according to claim 3, wherein the second means comprises a sonotrode and an anvil and wherein at least one of the sonotrode and the anvil has a convex working surface.

5. The apparatus according to claim 4, wherein the first means comprises two cooperative pressing tools, one disposed adjacent to the anvil and the other disposed adjacent to the sonotrode with both slightly spaced therefrom towards the fold line.

6. The apparatus according to claim 5, wherein the anvil and the one pressing tool are formed in an integral body and wherein the other pressing tool and the sonotrode are movable together whereby the holding and welding can be performed in a single station in a single step.

7. The apparatus according to claim 4, wherein the anvil has a rib of rounded cross section which extends in the direction of the fillet seam and acts as an abutment surface for the sonotrode.

* * * * *